(12) United States Patent
Torigata et al.

(10) Patent No.: US 11,396,707 B2
(45) Date of Patent: Jul. 26, 2022

(54) LAMINATE AND RUST PREVENTION METHOD

(71) Applicant: TECH-TAIYO KOGYO CO., LTD., Tokyo (JP)

(72) Inventors: Hiroshi Torigata, Tokyo (JP); Yuki Torigata, Tokyo (JP)

(73) Assignee: TECH-TAIYO KOGYO CO., LTD., Tokyo (JP)

( * ) Notice: Subject to any disclaimer, the term of this patent is extended or adjusted under 35 U.S.C. 154(b) by 0 days.

(21) Appl. No.: 17/420,698

(22) PCT Filed: Nov. 11, 2020

(86) PCT No.: PCT/JP2020/042013
§ 371 (c)(1),
(2) Date: Jul. 5, 2021

(87) PCT Pub. No.: WO2021/131366
PCT Pub. Date: Jul. 1, 2021

(65) Prior Publication Data
US 2022/0042180 A1  Feb. 10, 2022

(30) Foreign Application Priority Data

Dec. 23, 2019 (JP) .............................. JP2019-231836

(51) Int. Cl.
*C23F 11/14* (2006.01)
*C23F 11/173* (2006.01)
(Continued)

(52) U.S. Cl.
CPC .............. *C23F 11/14* (2013.01); *C09D 5/08* (2013.01); *C09D 5/106* (2013.01); *C23F 11/173* (2013.01)

(58) Field of Classification Search
CPC ........... C23F 11/10; C23F 11/12; C23F 11/14; C23F 11/141; C23F 11/173; C09D 5/00;
(Continued)

(56) References Cited

U.S. PATENT DOCUMENTS

| | | | | |
|---|---|---|---|---|
| 5,532,025 A | * | 7/1996 | Kinlen | H01B 1/128 252/500 |
| 5,853,621 A | * | 12/1998 | Miller | C09D 5/082 252/500 |

(Continued)

FOREIGN PATENT DOCUMENTS

| | | | |
|---|---|---|---|
| CN | 103555137 A | * | 2/2014 |
| CN | 103459669 B | | 1/2016 |

(Continued)

OTHER PUBLICATIONS

English language machine translation of Ueda et al. WO 2016/174746 A1 (Year: 2016).*

(Continued)

*Primary Examiner* — Matthew R Diaz
(74) *Attorney, Agent, or Firm* — Law Office of Katsuhiro Arai

(57) ABSTRACT

A laminate includes a layer containing a polyaniline-based polymer and a phenoxy-based resin, and a layer containing zinc and/or a zinc alloy, a laminate includes, in sequence, a layer containing a polyaniline-based polymer and a phenoxy-based resin, a layer containing zinc and/or a zinc alloy, and an aluminum or aluminum alloy layer. A rust prevention method includes forming a layer containing a polyaniline-based polymer and a phenoxy-based resin on a layer containing zinc and/or a zinc alloy or on a layer containing zinc and/or a zinc alloy disposed on an aluminum or aluminum alloy layer. The laminates and the rust prevention method are for reducing the formation of rust on the layer containing (Continued)

Example 1
1272 Hour

Comparative example 1
1272 Hour

Comparative example 2
1272 Hour

Comparative example 3
1272 Hour zinc and/or the zinc alloy or the aluminum or aluminum alloy layer for a long period of time.

3 Claims, 2 Drawing Sheets

(51) Int. Cl.
*C09D 5/08* (2006.01)
*C09D 5/10* (2006.01)

(58) Field of Classification Search
CPC . C09D 5/08; C09D 5/10; C09D 5/106; C09D 5/24; C09D 5/4473; C09D 5/4484; C09D 5/4492; C09D 163/00; C09D 163/04; C09D 171/00; C09D 179/02; H01B 1/12; H01B 1/128; H01B 1/20; B32B 15/08; B32B 15/092; B32B 15/20; B32B 27/38
See application file for complete search history.

(56) References Cited

U.S. PATENT DOCUMENTS

| | | | | |
|---|---|---|---|---|
| 6,440,332 | B1* | 8/2002 | Geer | C09D 5/10 |
| | | | | 252/500 |
| 7,601,280 | B2* | 10/2009 | Kinlen | C23F 11/00 |
| | | | | 252/387 |
| 2010/0203343 | A1* | 8/2010 | Takada | C09D 5/082 |
| | | | | 428/418 |
| 2014/0011048 | A1 | 1/2014 | Kwak et al. | |
| 2015/0010751 | A1* | 1/2015 | Wang | C09D 5/08 |
| | | | | 428/334 |
| 2016/0333191 | A1* | 11/2016 | Torigata | C09D 5/08 |
| 2017/0009082 | A1* | 1/2017 | Kroke | C09D 5/08 |
| 2018/0362777 | A1* | 12/2018 | Surwade | C09D 5/082 |

FOREIGN PATENT DOCUMENTS

| | | | | |
|---|---|---|---|---|
| CN | 107250301 | A | | 10/2017 |
| CN | 107400443 | A | | 11/2017 |
| JP | H036355 | A | | 1/1991 |
| JP | H05287593 | A | | 11/1993 |
| JP | H1121505 | A | | 1/1999 |
| JP | 2004237498 | A | | 8/2004 |
| JP | 2016155995 | A | | 9/2016 |
| JP | 6041962 | B2 | | 12/2016 |
| JP | WO2016174746 | A1 | | 5/2017 |
| WO | WO-2011058021 | A | * 5/2011 | ............ B22F 1/0059 |
| WO | 2016174746 | A1 | | 11/2016 |
| WO | WO-2016174746 | A1 | * 11/2016 | ............ B32B 15/08 |

OTHER PUBLICATIONS

A Notice of Reasons for Refusal issued by the Japanese Patent Office, dated Mar. 23, 2021, for Japanese counterpart application No. 2019-231836. (3 pages).

International Search Report (ISR) dated Dec. 28, 2020, issued for International application No. PCT/JP2020/042013. (2 pages).

A First Office Action issued by the State Intellectual Property Office of China dated Oct. 13, 2021 for Chinese counterpart application No. 202080007130.1 (8 pages).

* cited by examiner

Example 1
1272 Hour

Comparative
example 1
1272 Hour

Comparative
example 2
1272 Hour

Comparative
example 3
1272 Hour

Example 1
1008 Hour

Comparative
example 1
1008 Hour

Comparative
example 2
1008 Hour

Comparative
example 3
1008 Hour

Example 1
504 Hour

Comparative
example 1
504 Hour

Comparative
example 2
504 Hour

Comparative
example 3
504 Hour

LAMINATE AND RUST PREVENTION METHOD

CROSS-REFERENCE TO RELATED APPLICATIONS

This application is the U.S. National Phase under 35 U.S.C. § 371 of International Application PCT/JP2020/042013, filed Nov. 11, 2020, which claims priority to Japanese Patent Application No. JP2019-231836, filed Dec. 23, 2019. The International Application was published under PCT Article 21(2) in a language other than English.

TECHNICAL FIELD

The present invention relates to a laminate and a rust prevention method.

BACKGROUND ART

As a method for preventing rust on a metal, in particular, iron or an iron alloy such as a steel plate, in general, there is known a method of forming a plating coating film or a polymer compound coating film on the surface. As a method for preventing rust on aluminum, an aluminum alloy, zinc, or a zinc alloy, similarly, there is known a method of forming a plating coating film or a polymer compound coating film on the surface.

However, the method of forming a plating coating film or a polymer compound coating film has a drawback in that the coating film is likely to be missing and corrosion proceeds from the missing portion.

It is known that an antirust effect can be provided by controlling the electric potential of a metal to be constant. However, since this method requires a power supply, a counter electrode, and devices and equipment for electric potential control and the like, the range of the application of this method is technically and economically limited.

In addition, there has been proposed a method of forming a coating film of an electrically active compound to control the electric potential to be constant. For example, there is known a method of forming a coating film of a conductive polymer such as polyaniline on a metal surface.

Patent Literature 1 discloses that an anticorrosive coating film in which phosphoric acid is contained in a solid content containing polyaniline or a polyaniline derivative is provided on a surface of a steel plate. However, corrosion protection of aluminum or zinc is not described.

Patent Literatures 2 and 3 disclose that zinc or zinc alloy plating is performed in order to improve corrosion resistance of aluminum or an aluminum alloy.

Patent Literature 4 discloses a steel plate coated with a rust-preventive coating composition that contains a polyaniline component and a phenoxy resin, in which the formation of rust (red rust) in a salt spray test (JIS Z 2371) can be reduced. However, no consideration is given to the reduction in the formation of rust (such as white rust) of materials other than steel plates (iron), in particular, zinc or zinc alloys, and aluminum or aluminum alloys.

To date, there has not been known a corrosion protection method that is effective for rust (such as white rust) formed on aluminum, aluminum alloys, zinc, and zinc alloys.

CITATION LIST

Patent Literature

PTL 1: Japanese Unexamined Patent Application Publication No. 11-21505

PTL 2: Japanese Unexamined Patent Application Publication No. 3-6355

PTL 3: Japanese Unexamined Patent Application Publication No. 5-287593

PTL 4: Japanese Patent No. 6041962

SUMMARY OF INVENTION

Technical Problem

An object of the present invention is to provide a laminate which includes a layer containing zinc and/or a zinc alloy and on which rust is not formed for a long period of time. Another object is to provide a laminate which includes an aluminum or aluminum alloy layer and on which rust is not formed for a long period of time. Still another object is to provide a rust prevention method that can reduce the formation of rust on a laminate which includes a layer containing zinc and/or a zinc alloy and/or an aluminum or aluminum alloy layer for a long period of time.

Solution to Problem

The inventor of the present invention has conducted extensive studies in order to solve the problems described above, found that the problems can be solved by adopting the configurations described below, and completed the present invention.

The specific configurations are as follows.

[Item 1]
A laminate including:
a layer containing a polyaniline-based polymer and a phenoxy-based resin; and
a layer containing zinc and/or a zinc alloy.

[Item 2]
A laminate including, in sequence:
a layer containing a polyaniline-based polymer and a phenoxy-based resin;
a layer containing zinc and/or a zinc alloy; and
an aluminum or aluminum alloy layer.

[Item 3]
The laminate according to Item 2, in which the aluminum or aluminum alloy layer is an aluminum die-casting.

[Item 4]
A rust prevention method including forming a layer containing a polyaniline-based polymer and a phenoxy-based resin on a layer containing zinc and/or a zinc alloy or on a layer containing zinc and/or a zinc alloy disposed on an aluminum or aluminum alloy layer.

Advantageous Effects of Invention

According to the present invention, there is provided a laminate which includes a layer containing zinc and/or a zinc alloy and on which rust is not formed for a long period of time. In addition, there is provided a laminate which includes an aluminum or aluminum alloy layer and on which rust is not formed for a long period of time. Furthermore, there is provided a rust prevention method that can reduce the formation of rust on a laminate which includes a layer containing zinc and/or a zinc alloy and/or an aluminum or aluminum alloy layer for a long period of time.

DESCRIPTION OF EMBODIMENTS

Figure 1:
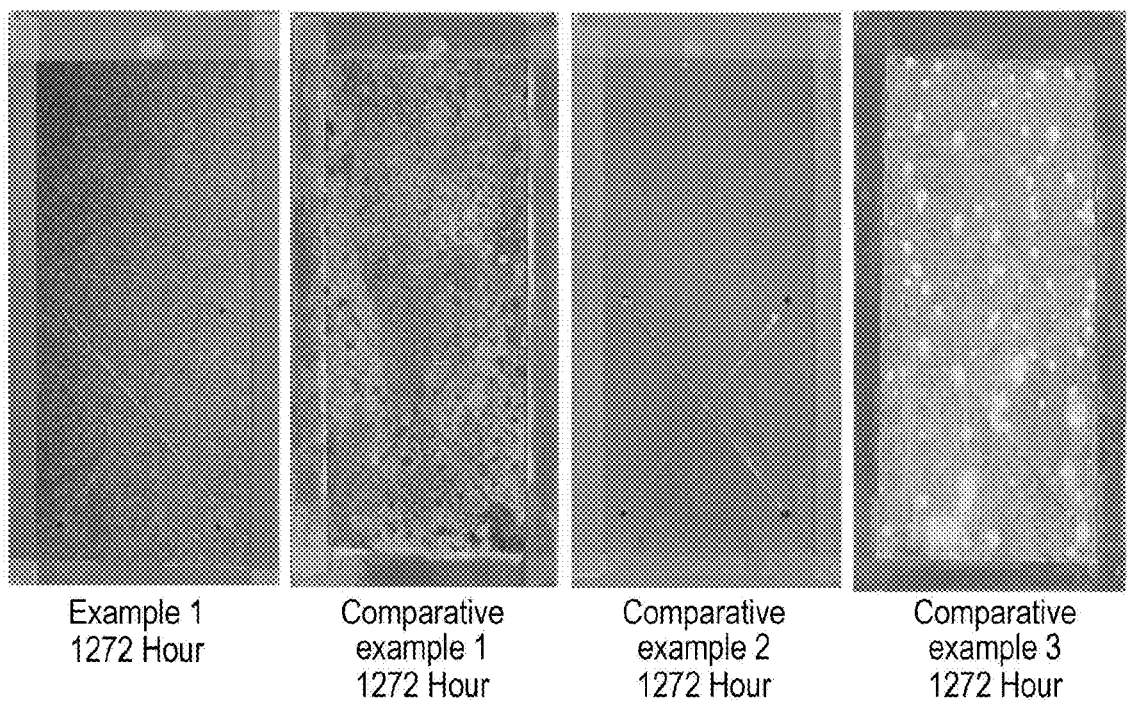
FIG. 1 includes photographs showing the results of a salt spray test for 1,272 hours.

Laminates and a rust prevention method according to the present invention will be described in detail below. Note that the present invention is not limited by embodiments described as examples below without departing from the gist thereof.

[Laminate]

A laminate according to the present invention is a laminate that includes a layer containing a polyaniline-based polymer and a phenoxy-based resin and a layer containing zinc and/or a zinc alloy.

A laminate according to the present invention is a laminate that includes, in sequence, a layer containing a polyaniline-based polymer and a phenoxy-based resin, a layer containing zinc and/or a zinc alloy, and an aluminum or aluminum alloy layer.

In the present invention, a layer other than the layer containing a polyaniline-based polymer and a phenoxy-based resin, the layer containing zinc and/or a zinc alloy, and the aluminum or aluminum alloy layer may be disposed as needed. For example, a layer that imparts a design, such as a topcoat layer, a colored layer, or a print layer, may be disposed on the layer containing a polyaniline-based polymer and a phenoxy-based resin. The laminate may include a metal or resin layer in addition to the layer containing zinc and/or a zinc alloy and the aluminum or aluminum alloy layer.

Moreover, the shape of the laminate according to the present invention is not limited to a plate shape, and the laminate may be formed to have any shape.

(Layer Containing Polyaniline-Based Polymer and Phenoxy-Based Resin)

The layer containing a polyaniline-based polymer and a phenoxy-based resin can be formed on a layer containing zinc and/or a zinc alloy by a known technique after preparation of a composition that contains a polyaniline-based polymer and a phenoxy-based resin.

In the layer containing a polyaniline-based polymer and a phenoxy-based resin, the polyaniline-based polymer content is 0.1% to 60% by mass, preferably 1% to 55% by mass, and more preferably 2% to 50% by mass in terms of solid content, and the phenoxy-based resin content is 10% to 99.9% by mass, preferably 20% to 99% by mass, and more preferably 30% to 90% by mass in terms of solid content. Regarding a ratio of the polyaniline-based polymer to the phenoxy-based resin, the polyaniline-based polymer is 0.05 to 150 parts by mass, preferably 0.1 to 120 parts by mass, more preferably 1 to 110 parts by mass, and still more preferably 1 to 100 parts by mass relative to 100 parts by mass of the phenoxy-based resin.

In addition, the layer containing a polyaniline-based polymer and a phenoxy-based resin may contain, for example, at least one selected from binder resins such as polyester, polystyrene, polyethylene, polyamide, polyimide, polyvinyl chloride, polyvinyl acetate, polypropylene, an epoxy resin, a phenolic resin, a silicone resin, a styrene-butadiene copolymer, polybutadiene, a fluororesin, polysiloxane, an acrylic resin, polycarbonate, polyacrylonitrile, polymethyl methacrylate, and an acrylonitrile-butadiene-styrene (ABS) resin and additives such as a curing agent, a leveling agent, a dispersant, a pigment, an antirust agent, and a fungicide.

—Polyaniline-Based Polymer—

Any known polyaniline-based polymer may be used as the polyaniline-based polymer without limitation. For example, commercially available products may be used. Alternatively, polyaniline-based polymers obtained by polymerizing aniline or an aniline derivative by a known electrolytic oxidative polymerization method or a known chemical oxidative polymerization method may be used. One or two or more polyaniline-based polymers may be used. In the present invention, polymerized products obtained by a chemical oxidative polymerization method and commercially available products are preferably used.

The weight-average molecular weight of the polyaniline-based polymer is not particularly limited, but is, for example, in the range of 1,000 to 1,000,000 measured by gel permeation chromatography (GPC) in terms of polystyrene from the viewpoint of conductivity and handleability. The weight-average molecular weight is preferably in the range of 2,000 to 500,000.

The aniline or aniline derivative used in the production of the polyaniline-based polymer is not particularly limited as long as it has an aniline skeleton. Examples thereof include aniline and compounds in which hydrogen on the benzene ring of aniline is substituted with at least one substituent selected from halogens, alkyl groups, aryl groups, alkoxy groups, a carboxyl group, a cyano group, a sulfonic group, and the like, and hydrochlorides and sulfates thereof. For example, it is possible to use at least one selected from aniline, o-toluidine, m-toluidine, o-ethylaniline, m-ethylaniline, o-ethoxyaniline, m-butylaniline, m-hexylaniline, m-octylaniline, 2,3-dimethylaniline, 2,5-dimethylaniline, 2,5-dimethoxyaniline, o-cyanoaniline, 2,5-dichloroaniline, 2-bromoaniline, 5-chloro-2-methoxyaniline, 3-phenoxyaniline, aminobenzenesulfonic acid, 2-aminoanisole-sulfonic acid, 3-aminoanisole-sulfonic acid, 4-aminoanisole-sulfonic acid, hydrochlorides and sulfates thereof, and the like. Preferably, at least one selected from aniline, aniline hydrochloride, aniline sulfate, aminobenzenesulfonic acid, alkoxyanilines, and the like is used.

Examples of an oxidizing agent (polymerization initiator) used in the production of the polyaniline-based polymer by chemical oxidative polymerization include oxidizing agents such as ammonium persulfate, potassium persulfate, potassium perchlorate, potassium chloride, potassium iodide, iron(II) chloride, and hydrogen peroxide. Preferably, examples of the oxidizing agent include persulfates typified by ammonium persulfate. The chemical oxidative polymerization may be performed under known conditions. For example, the reaction temperature is −40° C. to 80° C., preferably −5° C. to 30° C.

The polyaniline-based polymer may be a polyaniline-based polymer doped with a dopant by a known doping technique. The dopant is an acceptor dopant that is commonly used, and may be a known dopant. The dopant is, for example, at least one selected from halogens such as chlorine, bromine, and iodine; protonic acids such as hydrochloric acid, sulfuric acid, perchloric acid, tetramethylammonium perchlorate, tetrafluoroboric acid, sodium tetrafluoroborate, hexafluorophosphoric acid, and ammonium hexafluorophosphate, salts thereof, and anions thereof; Lewis acids such as phosphorus pentafluoride, arsenic pentafluoride, and boron trifluoride; transition metal halides such as titanium tetrachloride, zirconium tetrachloride, molybdenum pentafluoride, and ferric chloride; carboxylic acids such as benzoic acid, phthalic acid, and citric acid; sulfonic acids such as benzenesulfonic acid, naphthalenesulfonic acid, p-toluenesulfonic acid, ammonium p-toluenesulfonate, trimethylammonium naphthalenesulfonate, and ammonium polystyrene sulfonate, salts thereof, and anions thereof; and phenols such as p-t-butylphenol, m-t-octylphenol, and p-nitrophenol.

In the present invention, it is preferable to employ a method including subjecting aniline to chemical oxidative polymerization in the presence of a surfactant or a method including allowing aniline to react with a surfactant to provide an aniline monomer having an amphiphilic structure, and then subjecting the aniline monomer to chemical oxidative polymerization because a polyaniline-based polymer soluble in organic solvents and water can be obtained. Examples of the surfactant that can be used include cationic surfactants such as long-chain alkylammonium salts, anionic surfactants such as long-chain alkyl sulfates, and neutral surfactants.

Specifically, the polyaniline-based polymer can be obtained by mixing aniline hydrochloride or aniline sulfate, a surfactant such as dodecyl sodium sulfate or cetyltrimethylammonium bromide, and a solvent such as water, adding an oxidizing agent such as ammonium persulfate, hydrogen peroxide, or ferric chloride to the mixture to cause chemical oxidative polymerization, subsequently adding a poor solvent to precipitate polyaniline, and separating the polyaniline.

—Phenoxy-Based Resin—

Any known phenoxy-based resin may be used as the phenoxy-based resin without limitation. For example, commercially available products may be used. Alternatively, phenoxy-based resins obtained by polymerizing a bifunctional phenol and an epihalohydrin or a bifunctional epoxy resin may be used. One or two or more phenoxy-based resins may be used.

Examples of commercially available phenoxy-based resins include YP-50, YP-50EK35, YP-55, and YP-70 manufactured by NIPPON STEEL Chemical & Material Co., Ltd.; jER series (1256, 4250, 4275, 1256B40, 1255HX30, YX8100BH30, YX6954BH30, YX7200B35, YX7553BH30, 4256H40, and YX6954BH35) manufactured by Mitsubishi Chemical Corporation; and PKHA, PKHB, PKHB+, PKHC, PKHH, PKHJ, PKFE, PKHP-200, PKHW-34, PKHW-35, PKHW-38, PKCP-80, PKHM-301, PKHS-30PMA, and PKHS-40 manufactured by Gabriel Phenoxies, Inc.

Examples of the phenoxy-based resin include resins having an increased molecular weight, the resins being obtained by allowing a bifunctional phenol and an epihalohydrin to react with each other at a molar ratio of bifunctional phenol:epihalohydrin in the range of 1:0.8 to 1:1.2, and preferably 1:0.9 to 1:1.1, and resins having an increased molecular weight, the resins being obtained by subjecting a bifunctional phenol and a bifunctional epoxy resin to polyaddition reaction at an equivalent ratio of a phenolic hydroxyl group to an epoxy group in the range of 1:0.8 to 1:1.2, and preferably 1:0.9 to 1:1.1. For example, the phenoxy-based resin can be obtained by allowing a bifunctional phenol and an epihalohydrin to react with each other in the presence of a catalyst such as an alkali metal hydroxide in a non-reactive solvent at a temperature of 40° C. to 120° C. Alternatively, the phenoxy-based resin can be obtained by heating a bifunctional epoxy resin and a bifunctional phenol to 50° C. to 200° C. in the presence of a catalyst such as an alkali metal compound, an organophosphorus compound, or a cyclic amine compound in an organic solvent such as an amide, ether, ketone, lactone, or alcohol having a boiling point of 120° C. or higher at a reaction solid content of 50 parts by mass or less to subject the bifunctional epoxy resin and the bifunctional phenol to polyaddition reaction. Ends of the phenoxy-based resin may each be any functional group such as a phenolic hydroxyl group or an epoxy group.

The weight-average molecular weight of the phenoxy-based resin is 10,000 or more, preferably 10,000 to 100,000, and more preferably 30,000 to 70,000 from the viewpoint of solubility in organic solvents, and mechanical strength and chemical resistance of the coating film.

Examples of the bifunctional phenol used in the polymerization of the phenoxy-based resin include bisphenol-based compounds. Preferred examples thereof include compounds having at least one skeleton selected from a bisphenol A skeleton, a bisphenol F skeleton, a bisphenol S skeleton, a bisphenol AF skeleton, a bisphenol trimethylcyclohexane skeleton, a bisphenol acetophenone skeleton, a novolac skeleton, a biphenyl skeleton, a fluorene skeleton, a dicyclopentadiene skeleton, a naphthalene skeleton, an anthracene skeleton, an adamantane skeleton, a terpene skeleton, a trimethylcyclohexane skeleton, a styrene-glycidyl methacrylate copolymer skeleton, a cyclohexane skeleton, an imide skeleton, and a norbornene skeleton. Particularly preferably, the bifunctional phenol is at least one selected from bisphenol A and bifunctional phenols having a biphenyl skeleton and/or a cyclohexane skeleton.

An example of the epihalohydrin used in the polymerization of the phenoxy-based resin is epichlorohydrin. An example of the bifunctional epoxy resin used in the polymerization of the phenoxy-based resin is a bisphenol-based epoxy resin.

In the present invention, it is preferable to use a phenoxy-based resin obtained from bisphenol A and epichlorohydrin or phenoxy-based resin obtained from bisphenol A and a bisphenol A epoxy resin, the phenoxy-based resin having a weight-average molecular weight of 10,000 or more.

—Method for Forming Layer Containing Polyaniline-Based Polymer and Phenoxy-Based Resin—

Examples of a method for forming a layer containing a polyaniline-based polymer and a phenoxy-based resin include (1) a method including applying/printing a coating composition that contains a polyaniline-based polymer and a phenoxy-based resin and that may contain a solvent by using a coater (such as a spray coater, a powder coater, a die coater, a curtain coater, ink jet, or a dip coater), a printer, a brush, a roller, a blade, or the like or by immersing the coating composition; (2) a method in which such a coating composition is melted and extruded to cover a surface; and (3) a method including forming a film from a composition containing a polyaniline-based polymer and a phenoxy-based resin, and attaching the film by using a known technique such as pressure bonding. Preferably, the method may be a method including applying a coating composition that contains a polyaniline-based polymer and a phenoxy-based resin and that may contain a solvent.

The solvent that may be contained in the coating composition may be at least one selected from, for example, water and organic solvents such as ester solvents, e.g., ethyl acetate, ketone solvents, e.g., methyl ethyl ketone and cyclohexanone, aromatic solvents, e.g., xylene and toluene, alcohol solvents, e.g., methanol, ethanol, and butanol, ether solvents, e.g., diglyme, dioxane, and tetrahydrofuran, nitrile solvents, e.g., acetonitrile, and polar solvents, e.g., dimethylacetamide, dimethylformamide, N-methylpyrrolidone, and dimethyl sulfoxide.

In the present invention, the above formation method of (1) is preferably employed. In this case, preferably, a coating composition that contains a polyaniline-based polymer, a phenoxy-based resin, and a solvent (for example, a mixed solvent containing xylene and cyclohexanone) is applied and then dried to form a layer containing the polyaniline-based polymer and the phenoxy-based resin.

(Layer Containing Zinc and/or Zinc Alloy)

In a material component forming the layer containing zinc and/or a zinc alloy, the zinc may be pure zinc or zinc containing impurities in accordance with the degree of smelting (refining). Examples of the zinc alloy include zinc alloys containing, as alloy elements, at least one selected from Fe, Co, Ni, Al, Mn, Cr, Ti, Sn, Mg, Mo, P, B, and C.

The material component forming the layer containing zinc and/or a zinc alloy is preferably pure zinc, an Fe-based zinc alloy, a Co-based zinc alloy, a Ni-based zinc alloy, an Al-based zinc alloy, or a Mn-based zinc alloy, and more preferably pure zinc, an Fe-based zinc alloy, a Co-based zinc alloy, a Ni-based zinc alloy, or an Al-based zinc alloy.

The layer containing zinc and/or a zinc alloy may be formed from a layer having any shape such as a plate, a bar, a foil (sheet), or a molded product (zinc die-casting or zinc cast product). Alternatively, the layer may be a layer disposed on a base made of a metal, a resin, or the like. Examples of such a layer include plating layers formed by electroplating, hot dipping, deposition plating, electroless plating, or the like, thermal spray coating layers, coating layers of a paint containing a zinc powder (zinc-rich paint), and layers formed by sticking a foil (sheet/tape). The layer is preferably a plate, a bar, a sheet, a molded product, a coating layer of a zinc dust paint, a plating layer, a thermal spray coating layer, or a layer formed by sticking a foil (sheet/tape).

The thickness of the layer containing zinc and/or a zinc alloy is not particularly limited, and, for example, 0.1 μm to 10 mm, preferably 1 μm to 5 mm, and more preferably 1 μm to 2 mm.

When another layer is formed on the surface of the layer containing zinc and/or a zinc alloy, for example, cleaning treatment (such as degreasing) may be performed by a known technique.

(Aluminum or Aluminum Alloy Layer)

The aluminum or aluminum alloy layer may be formed from a layer having any shape such as a plate, a bar, a foil (sheet), or a molded product (aluminum die-casting or aluminum cast product). Alternatively, the layer may be a layer disposed on a base made of a metal, a resin, or the like. Examples of such a layer include plating layers formed by electroplating, hot dipping, deposition plating, electroless plating, or the like, thermal spray coating layers, evaporated films, coating layers of a paint containing a powder of aluminum or an aluminum alloy, and layers formed by sticking a foil (sheet/tape). The layer is preferably a plate, a bar, a foil (sheet), die-casting, a cast product, a plating layer, an evaporated film, a thermal spray coating layer, a layer formed by sticking a foil (sheet/tape), or the like.

In a material component forming the aluminum or aluminum alloy layer, the aluminum may be pure aluminum or aluminum containing impurities in accordance with the degree of smelting (refining). Examples of the aluminum alloy include aluminum alloys containing, as alloy elements, at least one selected from Si, Fe, Cu, Mn, Mg, Cr, Zn, Ga, V, Ni, B, Zr, and Ti. Examples of the material component forming the aluminum or aluminum alloy layer include materials whose type is specified in, for example, JIS H 4000:2014 (Aluminium and aluminium alloy sheets, strips and plates), JIS H 5302:2006 (Aluminium alloy die castings), or JIS H 2211:2010 (Aluminium alloy ingots for castings).

Preferred examples of the material component forming the aluminum or aluminum alloy layer include pure aluminum, A1100P, A1050P, A2014P, A2017P, A2219P, A21224P, A3104P, A5154P, A5083P, ADC1, ADC3, ADC5, ADC6, ADC10, ADC12, ADC14, AC1B, AC2A, AC2B, AC3A, AC4A, AC4B, AC4C, CHD, AC5A, AC7A, AC8A, AC8B, AC8C, AC9A, and AC9B.

The thickness or the like of the aluminum or aluminum alloy layer is not particularly limited. In the case of a plate, a bar, a foil, or a molded product, the layer may have any thickness or shape of, for example, 0.1 mm or more. In the case of an aluminum or aluminum alloy layer disposed on a base made of a metal or a resin, the thickness or the like is 0.1 to 1,000 μm, and preferably 1 to 500 μm.

When another layer is formed on the surface of the aluminum or aluminum alloy layer, for example, removal of an oxide film on the surface and cleaning treatment (such as degreasing) may be performed.

[Rust Prevention Method]

A rust prevention method according to the present invention includes forming a layer containing a polyaniline-based polymer and a phenoxy-based resin on a layer containing zinc and/or a zinc alloy or on a layer containing zinc and/or a zinc alloy disposed on an aluminum or aluminum alloy layer.

Herein, the layer containing zinc and/or a zinc alloy, the aluminum or aluminum alloy layer, and the layer containing a polyaniline-based polymer and a phenoxy-based resin can be the same as those described in the laminates according to the present invention.

The rust prevention method according to the present invention can effectively prevent rust from forming on a layer containing zinc and/or a zinc alloy or an aluminum or aluminum alloy layer and has a very high industrial utility value.

EXAMPLES

Next, the present invention will be described in detail by way of Examples and Comparative examples, but the present invention is not limited to the Examples.

[Test Plate]

A zinc-rich paint (ECostCoat Zn primer, manufactured by TECH-TAIYO KOGYO Co., LTD.) was applied to an aluminum plate (JIS H 4000:2014 A1100P) so as to provide a dry coating film of about 30 μm. Thus, a test plate including, on a surface of the aluminum plate, a zinc-containing layer having a thickness of 30 μm was prepared.

[Material for Forming Layer Containing Polyaniline-Based Polymer and Phenoxy-Based Resin]

A material 1 for forming a layer containing a polyaniline-based polymer and a phenoxy-based resin was prepared by mixing and stirring 1.5 parts by mass of polyaniline particles (particle size: about 10 to 50 nm) obtained by a chemical oxidative polymerization method and 100 parts by mass of a phenoxy-based resin (YP-50EK35; solid content: 35% by mass, manufactured by NIPPON STEEL Chemical & Material Co., Ltd.).

A material 2 for forming a layer containing a polyaniline-based polymer and a phenoxy-based resin was prepared by mixing and stirring 3.0 parts by mass of the same polyaniline particles as those used above and 100 parts by mass of the same phenoxy-based resin as that used above.

[Material for Forming Polyaniline-Based Polymer Layer]

A material for forming a polyaniline-based polymer layer was prepared by mixing the same polyaniline particles as those used in the preparation of the materials for forming a layer containing a polyaniline-based polymer and a phenoxy-based resin with a mixed solvent of xylene and cyclohexanone.

[Material for Forming Phenoxy-Based Resin Layer]

The same phenoxy-based resin as that used in the preparation of the materials for forming a layer containing a polyaniline-based polymer and a phenoxy-based resin was prepared as a material for forming a phenoxy-based resin layer.

Example 1 and Comparative Examples 1 to 3

A laminate of Example 1 was produced by applying the material 1 for forming a layer containing a polyaniline-based polymer and a phenoxy-based resin to the surface of the zinc-containing layer of the test plate so as to have a dry film thickness of 35 μm.

A laminate of Comparative example 1 was produced by applying the material for forming a polyaniline-based polymer layer to the surface of the zinc-containing layer of the test plate. A laminate of Comparative example 2 was produced by applying the material for forming a phenoxy-based resin layer to the surface of the zinc-containing layer of the test plate. A laminate of Comparative example 3 was produced without applying anything to the surface of the zinc-containing layer of the test plate.

Figure 2:
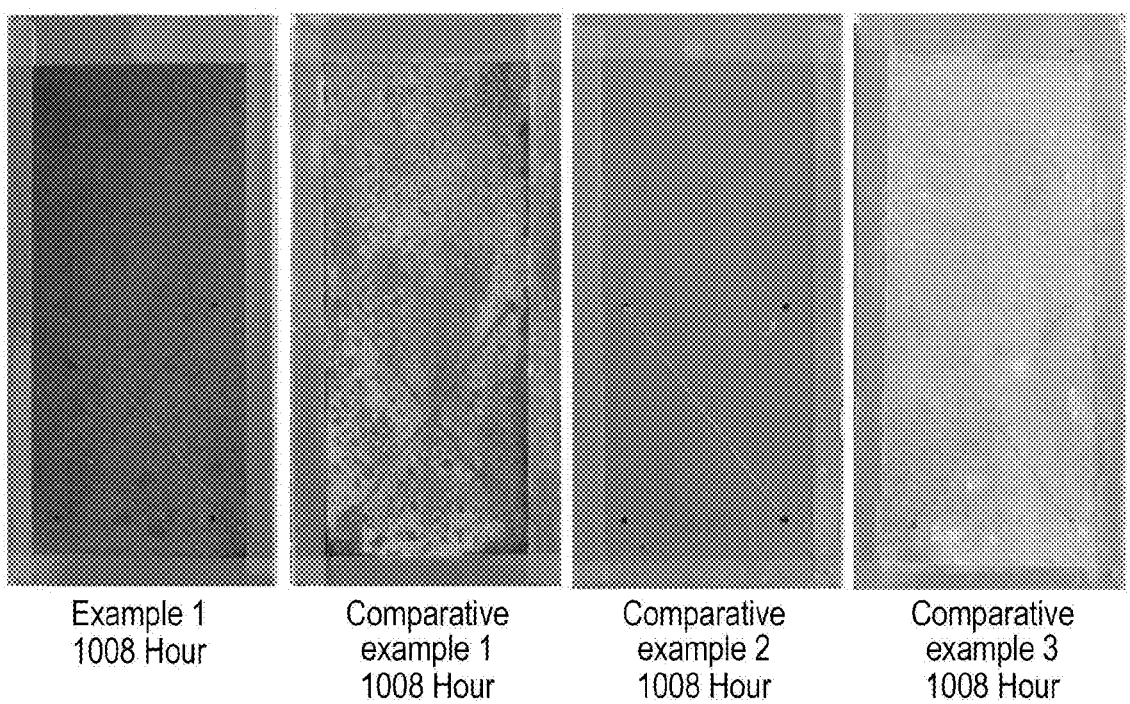
FIG. 2 includes photographs showing the results of a salt spray test for 1,008 hours.
Figure 3:
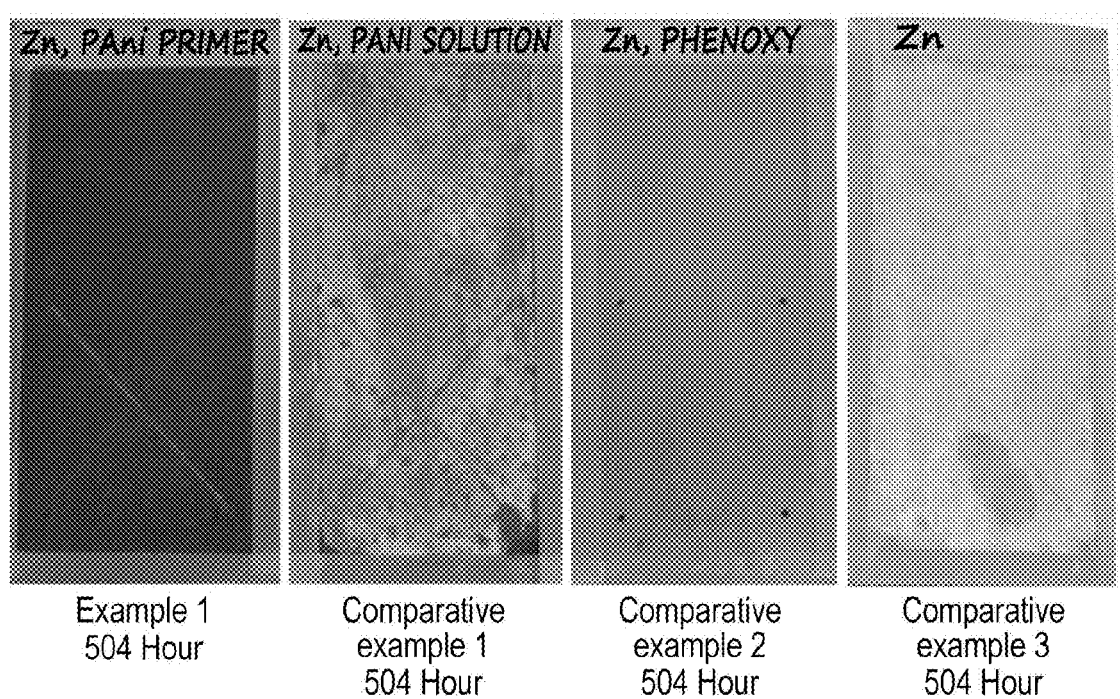
FIG. 3 includes photographs showing the results of a salt spray test for 504 hours.

The laminates produced as described above were subjected to a salt spray test (in accordance with JIS Z 2371:2015) such that the layer containing the polyaniline-based polymer and the phenoxy-based resin (Example 1), the polyaniline-based polymer layer (Comparative example 1), the phenoxy-based resin layer (Comparative example 2), and the zinc-containing layer (Comparative example 3) served as exposed surfaces (test surfaces), and the states after 1,272 hours, 1,008 hours, and 504 hours were visually observed. The results are shown in Table 1 and FIGS. 1 to 3.

TABLE 1

| | | Example 1 | Comparative example 1 | Comparative example 2 | Comparative example 3 |
|---|---|---|---|---|---|
| Laminate structure | Surface layer | Polyaniline-based polymer and phenoxy-based resin | Polyaniline-based polymer | Phenoxy-based resin | None |
| | Intermediate layer | Zinc dust paint (Zinc-rich paint) coating film | Zinc dust paint (Zinc-rich paint) coating film | Zinc dust paint (Zinc-rich paint) coating film | Zinc dust paint (Zinc-rich paint) coating film |
| | Base layer | Aluminum plate | Aluminum plate | Aluminum plate | Aluminum plate |
| Salt spray test 1,272 hours | | No change is found. | Rust outflow of Zn is formed over the whole. Macro-corrosion occurs partially. | White rust is formed in cuts. The whole is whitened. Streaky white rust is partially formed. | Macro-corrosion occurs over the whole. |
| Salt spray test 1,008 hours | | No change is found. | White rust is formed over the whole. | White rust is formed in part of cuts. White rust is formed on part of the coated surface. | White rust is formed over the whole. |
| Salt spray test 504 hours | | No change is found. | White rust is formed over the whole. | White rust is formed in part of cuts. | White rust is formed over the whole. |

Example 2 and Comparative Example 4

A laminate of Example 2 was produced by applying the material 2 for forming a layer containing a polyaniline-based polymer and a phenoxy-based resin to a galvanized surface of a commercially available galvanized steel plate (zinc layer thickness: about 21 μm) so as to have a dry film thickness of 35 μm.

According to the results of a salt spray test (in accordance with JIS Z 2371:2015), even in visual inspection after the lapse of 576 hours, the formation of rust (red rust and white rust) was not observed.

In contrast, in the case of a laminate of Comparative example 4 in which the layer containing a polyaniline-based polymer and a phenoxy-based resin was not formed, rust (red rust and white rust) was confirmed to be severely formed in visual inspection after the lapse of 576 hours.

The results of Examples and Comparative examples show that the laminates according to the present invention are laminates on which rust is not formed for a long period of time. The results further show that the rust prevention method according to the present invention can reduce the formation of rust on zinc, a zinc alloy, aluminum, or an aluminum alloy for a long period of time.

The invention claimed is:

1. A laminate comprising, in sequence:
   a layer containing a polyaniline-based polymer and a phenoxy-based resin at a ratio such that the polyaniline-based polymer is 0.05 to 150 parts by mass relative to 100 parts by mass of the phenoxy-based resin;
   a layer containing zinc and/or a zinc alloy, which is a coating layer of a paint containing zinc metal powder and/or zinc alloy metal powder; and
   an aluminum or aluminum alloy layer.

2. The laminate according to claim 1, wherein the aluminum or aluminum alloy layer is an aluminum die-casting.

3. A rust prevention method comprising forming a layer containing a polyaniline-based polymer and a phenoxy-based resin on a layer containing zinc and/or a zinc alloy disposed on an aluminum or aluminum alloy layer, wherein
   a ratio of the polyaniline-based polymer to the phenoxy-based resin is such that the polyaniline-based polymer is 0.05 to 150 parts by mass relative to 100 parts by mass of the phenoxy-based resin; and
   the layer containing zinc and/or a zinc alloy is a coating layer of a paint containing zinc metal powder and/or zinc alloy metal powder.

* * * * *